United States Patent
Hung

(10) Patent No.: US 6,328,539 B1
(45) Date of Patent: Dec. 11, 2001

(54) HYDRAULIC DEVICE POWERED BY WAVE

(76) Inventor: Sheng Hu Hung, 6F-4, No. 33, Jen Yi Street, Taichung, 402 (TW)

( * ) Notice: Subject to any disclaimer, the term of this patent is extended or adjusted under 35 U.S.C. 154(b) by 0 days.

(21) Appl. No.: 09/608,724

(22) Filed: Jun. 30, 2000

(51) Int. Cl.7 .............................. F04B 17/00; F16D 31/02
(52) U.S. Cl. ........................ 417/330; 417/332; 417/333; 60/398
(58) Field of Search ................................. 417/330, 331, 417/332, 333; 60/398, 495; 290/53

(56) References Cited

U.S. PATENT DOCUMENTS

| | | | |
|---|---|---|---|
| 4,103,490 | * | 8/1978 | Gorlov ................................... 60/398 |
| 4,363,213 | * | 12/1982 | Paleologos ........................... 417/333 |
| 4,580,400 | * | 4/1986 | Watabe et al. ........................ 60/398 |
| 4,625,124 | * | 11/1986 | Ching-An ............................. 417/330 |

FOREIGN PATENT DOCUMENTS 56-115871 * 11/1981 (JP).

\* cited by examiner

*Primary Examiner*—Charles G. Freay
*Assistant Examiner*—Michael K. Gray
(74) *Attorney, Agent, or Firm*—Charles E. Baxley

(57) ABSTRACT

A hydraulic device powered by a wave includes one or more posts secured on a sea floor, a float buoyant on the wave, a housing secured to the posts and having a slidable piston for separating the interior of the housing into two chambers. Four pipes are coupled to the chambers of the housing with four check valves, for allowing the fluid to be drawn into the chambers from two of the pipes and to be forced out of the chambers into the other pipes step by step in order to generate a hydraulic power or energy and for powering or actuating the other facilities.

8 Claims, 3 Drawing Sheets

US 6,328,539 B1

HYDRAULIC DEVICE POWERED BY WAVE

BACKGROUND OF THE INVENTION

1. Field of the Invention

The present invention relates to a hydraulic device, and more particularly to a hydraulic device powered by wave, such as the sea wave.

2. Description of the Prior Art

Water has been widely used for generating electricity. But, huge dams are required to be constructed for storing the required water. Various kinds of solar collecting devices have also been widely developed. However, the solar collecting efficiency is still bad and may not be satisfied.

The present invention has arisen to mitigate and/or obviate the afore-described disadvantages of the conventional energy collecting devices.

SUMMARY OF THE INVENTION

The primary objective of the present invention is to provide a hydraulic device powered by wave, such as the sea wave, to generate the required energy or power. The wave may be generated by the gravity between the earth, the moon, and the sun, and may be transformed into the hydraulic force in order to actuate the other facilities or to generate the electricity.

In accordance with one aspect of the invention, there is provided a hydraulic device powered by a wave comprising at least one post for securing on a sea floor, a float for buoyant on the wave, a pump including a housing having an interior provided therein, a piston slidably received in the interior of the housing for separating the interior of the housing into a first chamber and a second chamber, means for coupling the piston to the float, a first pipe coupled to the first chamber of the housing via a first check valve for allowing a fluid to flow from the first pipe into the first chamber of the housing via the first check valve, a second pipe coupled to the first chamber of the housing via a second check valve for allowing the fluid to flow from the first chamber of the housing into the second pipe via the second check valve, a third pipe coupled to the second chamber of the housing via a third check valve for allowing the fluid to flow from the third pipe into the second chamber of the housing via the third check valve, a fourth pipe coupled to the second chamber of the housing via a fourth check valve for allowing the fluid to flow from the second chamber of the housing into the fourth pipe via the fourth check valve, and means for attaching the housing of the pump onto the post. When the piston is moved between the chambers, the fluid may be drawn into the first chamber of the housing from the first pipe and may be forced out of the first chamber of the housing into the second pipe, and may be drawn into the second chamber of the housing from the third pipe and may be forced out of second chamber of the housing into the fourth pipe, such that the fluid forced out through the second and the fourth pipes may be used as the hydraulic energy to actuate or to power the other facilities or to generate the electricity.

The attaching means includes a support disposed on the post, and means for securing the housing to the support and having an adjustable securing device for adjustably securing the housing to the support.

The coupling means includes an extension extended from the piston and coupled to the float and pivotally secured to the float with a pivot pin.

A device is further provided for fastening the float to the post and includes a base secured to the post, the float is pivotally secured to the base with a pivot axle. The float may also be directly and pivotally secured to the post with the pivot axle without the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
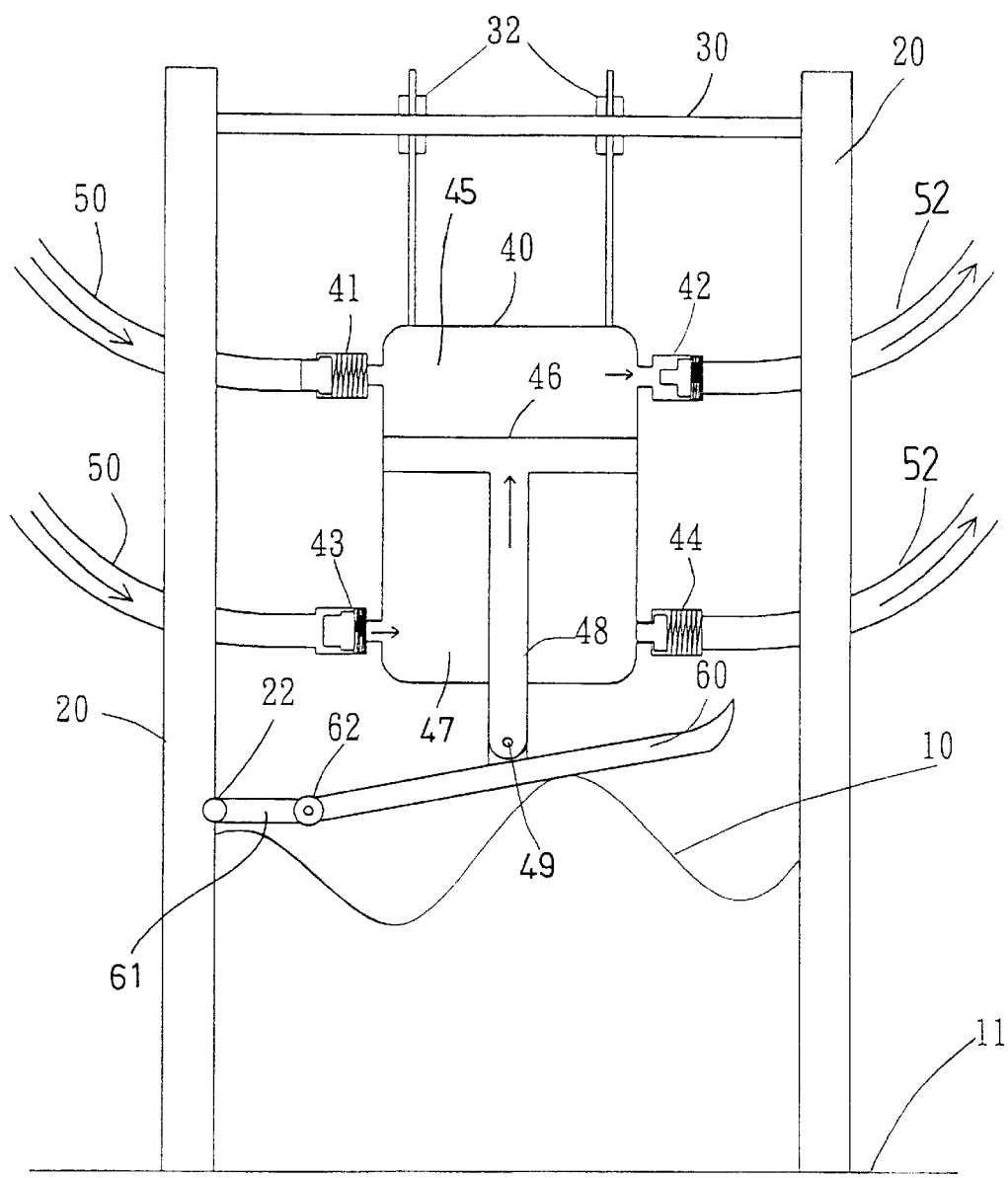
FIG. 1 is a plane schematic view of a hydraulic device in accordance with the present invention.
Figure 2:
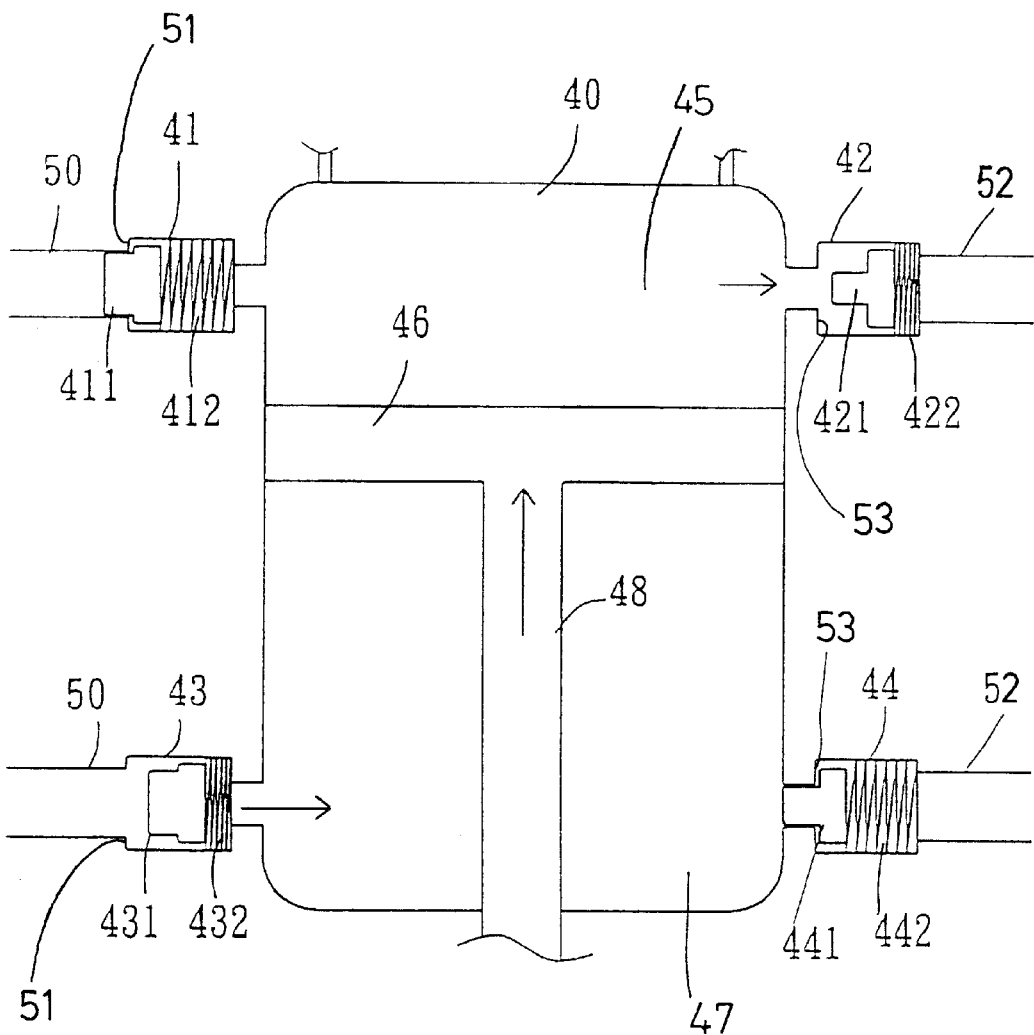
FIG. 2 is an enlarged partial plane schematic view of the hydraulic device.

Referring to the drawings, and initially to FIGS. 1 and 2, a hydraulic device in accordance with the present invention comprises one or more posts 20 secured on sea floor 11 and extended above the wave, particularly the sea wave 10, so as to be powered or actuated by the wave 10. A float 60 is pivotally secured to or has one end pivotally secured to one of the posts 20 at a pivot axle 62. Or, the float 60 has one end pivotally secured to a base 61 at the pivot axle 62, and the base 61 is a detachably and/or adjustably secured to the post 20 at a coupler 22, for allowing the base 61 and thus the float 60 to be adjusted up and down along the post 20 according to the status of the wave 10, and for allowing the float 60 to be actuated by the wave 10. The wave may be generated by the gravity between the earth, the moon, and the sun, and may be transformed into the hydraulic force in order to actuate the other facilities or to generate the electricity.

A support 30, such as a beam, is secured on the posts 20, and/or may be adjustably secured to the posts 20 for allowing the support 30 to be adjusted up and down relative to the posts 20 in correspondence to or according to the wave 10. An actuator or a pump includes a housing 40 secured to the support 30 by an adjustable securing device 32, for allowing the housing 40 to be adjusted up and down relative to the posts 20 in correspondence to or according to the wave 10. The housing 40 includes an interior having a piston 46 slidably received therein for separating the interior of the housing 40 into two chambers 45, 47. The piston 46 includes an extension 48 extended outward of the housing 40 and engaged with or pivotally coupled to the float 60 at a pivot pin 49, for allowing the piston 46 to be moved in the housing 40 by the wave via the float 60.

Two pipes 50 are coupled to the housing 40 and communicating with the chambers 45, 47 of the housing 40 respectively via the check valves 41, 43 respectively for allowing the fluid or the liquid or the hydraulic oil to flow into the respective chambers 45, 47 of the housing 40 via the check valves 41, 43. The fluid or the liquid or the hydraulic oil may be prevented from flowing out of the respective chambers 45, 47 of the housing 40 and into the pipes 50 through the respective check valves 41, 43. The other two pipes 52 are coupled to the housing 40 and communicating with the chambers 45, 47 of the housing 40 respectively via the other check valves 42, 44 respectively for allowing the fluid or the liquid or the hydraulic oil to flow out of the respective chambers 45, 47 of the housing 40 via the check valves 42, 44. The fluid or the liquid or the hydraulic oil may be prevented from flowing into the respective chambers 45, 47 of the housing 40 from the respective pipes 52 through the respective check valves 42, 44.

As best shown in FIG. 2, the check valve 41 includes a plug 411 biased by a spring 412 to engage with a valve seat 51 that is formed or provided between the check valve 41 and the pipe 50 for allowing the fluid or the liquid or the hydraulic oil to flow into the chamber 45 of the housing 40 via the check valve 41 and for preventing the fluid or the liquid or the hydraulic oil from flowing out of the chamber 45 of the housing 40 and into the pipe 50 through the check valve 41. The check valve 42 includes a plug 421 biased by a spring 422 to engage with a valve seat 53 that is formed or provided between the check valve 42 and the housing 40 for allowing the fluid or the liquid or the hydraulic oil to flow out of the chamber 45 of the housing 40 into the pipe 52 via the check valve 42 and for preventing the fluid or the liquid or the hydraulic oil from flowing into the chamber 45 of the housing 40 from the pipe 52 through the check valve 42. The check valve 43 includes a plug 431 biased by a spring 432 to engage with a valve seat 51 that is formed or provided between the check valve 43 and the pipe 50 for allowing the fluid or the liquid or the hydraulic oil to flow into the chamber 47 of the housing 40 via the check valve 43 and for preventing the fluid or the liquid or the hydraulic oil from flowing out the chamber 47 of the housing 40 and into the pipe 50 through the check valve 43. The check valve 44 includes a plug 441 biased by a spring 442 to engage with a valve seat 53 that is formed or provided between the check valve 44 and the housing 40 for allowing the fluid or the liquid or the hydraulic oil to flow out of the chamber 47 of the housing 40 into the pipe 52 via the check valve 44 and for preventing the fluid or the liquid or the hydraulic oil from flowing into the chamber 47 of the housing 40 from the pipe 52 through the check valve 44.

Figure 3:
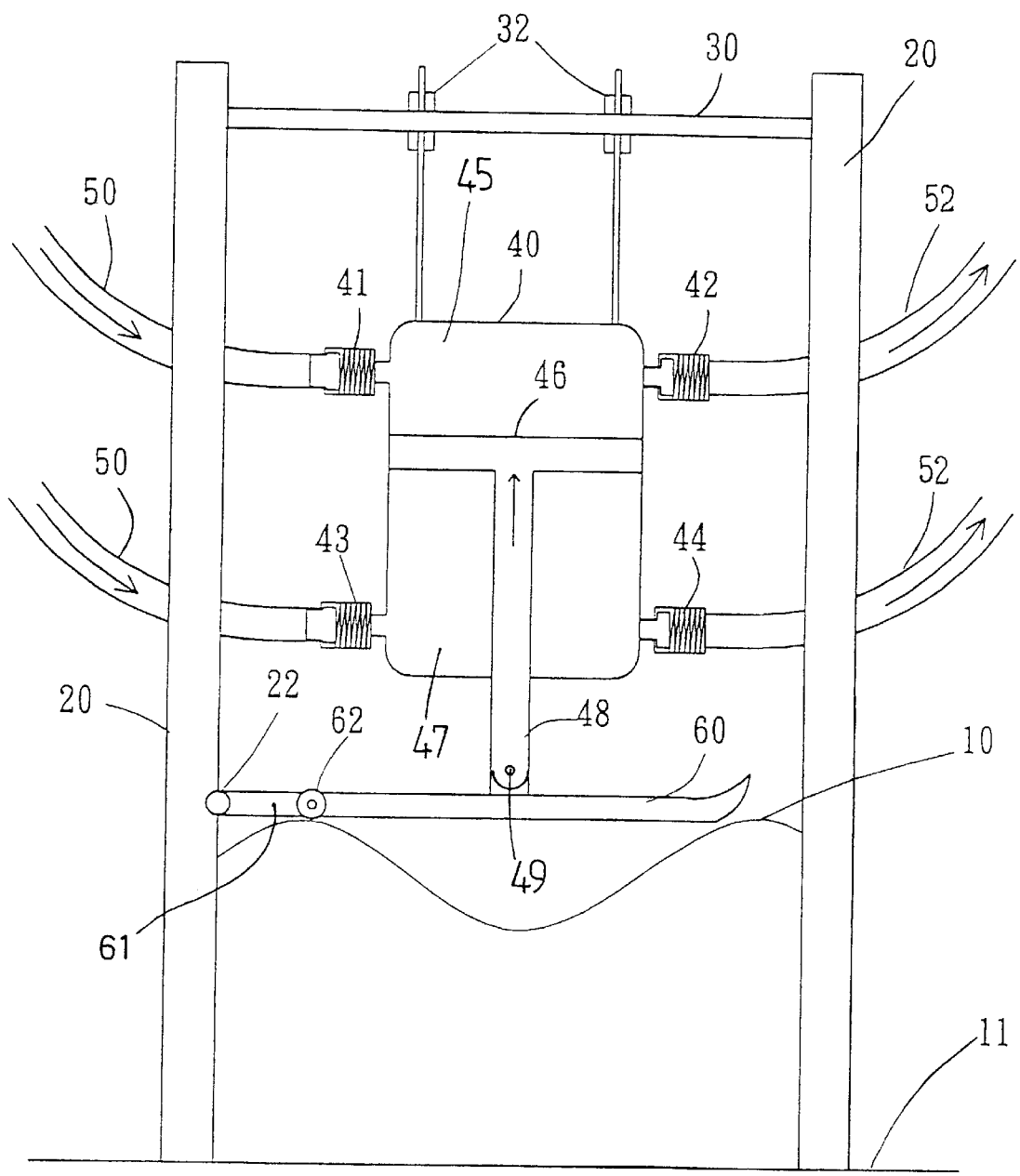
FIG. 3 is a plane schematic view similar to FIG. 1, illustrating the operation of the hydraulic device.

In operation, as shown in FIGS. 2 and 3, the piston 46 may be moved in the housing 40 to reduce or to enlarge the volume of the chambers 45, 47 of the housing 40. For example, when the piston 46 is moved toward one end of the housing 40 to reduce the volume of the chamber 45 of the housing 40, the check valve 41 may be blocked and the fluid or the liquid or the hydraulic oil in the chamber 45 of the housing 40 may be forced out of the chamber 45 of the housing 40 through the check valve 42. At this moment, the check valve 44 may be blocked and the fluid or the liquid or the hydraulic oil may be drawn into the chamber 47 of the housing 40 via the check valves 43. On the contrary, when the piston 46 is moved toward the other end of the housing 40 to reduce the volume of the other chamber 47 of the housing 40, the check valve 43 may be blocked and the fluid or the liquid or the hydraulic oil in the chamber 47 of the housing 40 may be forced out of the chamber 47 of the housing 40 through the check valve 44. At this moment, the check valve 42 may be blocked and the fluid or the liquid or the hydraulic oil may be drawn into the chamber 45 of the housing 40 via the check valves 41. The fluid or the liquid or the hydraulic oil may thus be forced into the respective chambers 45, 47 of the housing 40 from the pipes 50 via the check valves 41, 43, and may be forced out of the respective chambers 45, 47 of the housing 40 and into the pipes 52 through the check valves 42, 44 step by step in order to generate the hydraulic power. The fluid or the liquid or the hydraulic oil forced out through the pipes 52 may thus be used as a hydraulic energy to actuate the other facilities or to generate electricity.

The housing 40 of the pump may be adjusted up and down relative to the posts 20 with the adjustable securing device 32; and/or the support 30 may be adjusted up and down relative to the posts 20 with the other adjustable securing devices; and/or the base 61 or the float 60 may be adjusted up and down relative to the posts 20 with the coupler 22, such that the float 60 and the pump may be adjusted to be actuated by the wave 10 any time, and such that the wave 10 may be effectively used to generate the hydraulic power or energy.

It is to be noted that the float 60 may simply be disposed or buoyant on the wave 10, without being coupled to the posts 20, and may also be moved up and down by the wave 10.

Accordingly, the hydraulic device in accordance with the present invention may be powered by wave to generate the required energy or power.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hydraulic device powered by a wave, said hydraulic device comprising:

at least one post for securing on a sea floor, a float buoyant on the wave, a pump including a housing having an interior provided therein, a piston slidably received in said interior of said housing for separating said interior of said housing into a first chamber and a second chamber, means for coupling said piston to said float, a first pipe coupled to said first chamber of said housing via a first check valve for allowing a fluid to flow from said first pipe into said first chamber of said housing via said first check valve, a second pipe coupled to said first chamber of said housing via a second check valve for allowing the fluid to flow from said first chamber of said housing into said second pipe via said second check valve, a third pipe coupled to said second chamber of said housing via a third check valve for allowing the fluid to flow from said third pipe into said second chamber of said housing via said third check valve, a fourth pipe coupled to said second chamber of said housing via a fourth check valve for allowing the fluid to flow from said second chamber of said housing into said fourth pipe via said fourth check valve, and means for attaching said housing of said pump onto said at least one post.

2. The hydraulic device according to claim 1, wherein said attaching means includes a support disposed on said at least one post, and means for securing said housing to said support.

3. The hydraulic device according to claim 2, wherein said securing means includes an adjustable securing device for adjustably securing said housing to said support.

4. The hydraulic device according to claim 1, wherein said coupling means includes an extension extended from said piston and coupled to said float.

5. The hydraulic device according to claim 4, wherein said extension of said piston is pivotally secured to said float with a pivot pin.

6. The hydraulic device according to claim 1, further comprising means for fastening said float to said at least one post.

7. The hydraulic device according to claim 6, wherein said fastening means includes a base secured to said at least one post, said float is pivotally secured to said base with a pivot axle.

8. The hydraulic device according to claim 1, wherein said float is pivotally secured to said at least one post with a pivot axle.

* * * * *